(12) United States Patent
Schmidt et al.

(10) Patent No.: US 10,501,192 B2
(45) Date of Patent: Dec. 10, 2019

(54) ADJUSTABLE RELEASE LANYARD

(71) Applicant: GOODRICH CORPORATION, Charlotte, NC (US)

(72) Inventors: Ryan Schmidt, Gilbert, AZ (US); Andre Hessling von Heimendahl, Koblenz (DE)

(73) Assignee: GOODRICH CORPORATION, Charlotte, NC (US)

( * ) Notice: Subject to any disclaimer, the term of this patent is extended or adjusted under 35 U.S.C. 154(b) by 299 days.

(21) Appl. No.: 15/641,532

(22) Filed: Jul. 5, 2017

(65) Prior Publication Data

US 2019/0009914 A1 Jan. 10, 2019

(51) Int. Cl.
*B64D 25/14* (2006.01)
*F16G 11/10* (2006.01)
*F16K 27/02* (2006.01)

(52) U.S. Cl.
CPC .............. *B64D 25/14* (2013.01); *F16G 11/10* (2013.01); *F16K 27/02* (2013.01)

(58) Field of Classification Search
CPC .......... B64D 25/14; B64D 17/32; F16G 11/10
See application file for complete search history.

(56) References Cited

U.S. PATENT DOCUMENTS

| 4,031,827 | A | * | 6/1977 | Collier | F42C 15/295 |
| | | | | | 102/208 |
| 4,637,577 | A | * | 1/1987 | Miseyko | B64D 25/10 |
| | | | | | 244/142 |
| 6,021,731 | A | * | 2/2000 | French | B63G 8/24 |
| | | | | | 114/121 |
| 6,029,686 | A | * | 2/2000 | Pirkle | F16K 31/002 |
| | | | | | 137/315.25 |
| 6,065,914 | A | | 5/2000 | Fotou | |
| 6,315,629 | B1 | * | 11/2001 | Jones | A63H 27/005 |
| | | | | | 446/212 |
| 7,422,400 | B2 | | 9/2008 | Hsieh | |
| 7,448,925 | B2 | * | 11/2008 | Viggiano | B63C 9/0011 |
| | | | | | 180/272 |
| 7,497,181 | B2 | * | 3/2009 | Viggiano | B63C 9/0005 |
| | | | | | 114/102.1 |
| 7,553,205 | B2 | * | 6/2009 | LoSchiavo | B63C 9/0005 |
| | | | | | 440/1 |
| 8,262,311 | B2 | * | 9/2012 | Trice | B25G 1/04 |
| | | | | | 403/109.3 |
| 9,296,484 | B2 | * | 3/2016 | Biro | B64D 25/14 |
| 9,366,315 | B2 | * | 6/2016 | Tylaska | F16G 11/10 |
| 9,522,738 | B2 | | 12/2016 | Schmidt et al. | |
| 10,131,046 | B2 | * | 11/2018 | Nielsen | F16G 11/10 |

* cited by examiner

*Primary Examiner* — Brian M O'Hara
(74) *Attorney, Agent, or Firm* — Snell & Wilmer, L.L.P.

(57) ABSTRACT

A lanyard assembly for an evacuation system may comprise a lanyard body and a pin housing. The lanyard body may comprise an actuator connect portion, a pin housing connect portion, and a center member extending between the actuator connect portion and the pin housing connect portion. The pin housing may be slidably coupled to the pin housing connect portion of the lanyard body.

20 Claims, 10 Drawing Sheets

ADJUSTABLE RELEASE LANYARD

FIELD

The disclosure relates generally to aircraft evacuation systems and, more particularly, to an evacuation system including an adjustable lanyard assembly.

BACKGROUND

Emergency evacuation systems may be used to exit an aircraft absent a jet way or other suitable means of egress for passengers. Fuselage-mounted evacuation systems may include a fabric retention device, often referred to as a "soft cover," to secure the evacuation slide within a storage container or packboard. The soft cover may have two fabric panels attached to the container to form a lid. The fabric panels may be laced together using speed lacing. For example, a daisy chain configuration, culminating in a final loop with a removable release pin located in the final loop, may be employed to secure the fabric panels. Upon removal of the release pin from the final loop, the panels may open and the evacuation slide may deploy. A location of the final loop and the release pin may vary between evacuation systems. Accordingly, a device capable of removing release pins at a multitude of locations is desired.

SUMMARY

A lanyard assembly for an evacuation system is provided, in accordance with various embodiments. A lanyard assembly for an evacuation system may comprise a lanyard body comprising an actuator connect portion, a pin housing connect portion, and a center member extending between the actuator connect portion and the pin housing connect portion. A pin housing may be slidably coupled to the pin housing connect portion of the lanyard body.

In various embodiments, the pin housing connect portion may comprise a plurality of teeth. The pin housing may comprise a pawl configured to engage the plurality of teeth. A pin may be located in the pin housing. The pin may comprise a metal. The pin housing may comprise a plastic. The lanyard body may comprise a plastic.

In various embodiments, the actuator connect portion may be threaded. The actuator connect portion may comprise a disrupted thread. An end of the center member proximate the actuator connect portion may comprises a first flat surface and a second flat surface opposite the first flat surface.

An evacuation system is provided, in accordance with various embodiments. An evacuation system may comprise an inflatable slide, a soft cover containing the inflatable slide, and a lace holding the soft cover closed. A lanyard assembly may be coupled to an actuator. The lanyard assembly may comprise a lanyard body and a pin housing slidably coupled to the lanyard body and configured to retain the lace. The lanyard body may comprise an actuator connect portion. The actuator connect portion may be coupled to a piston of the actuator.

In various embodiments, the actuator may be configured to release the lace by translating the lanyard assembly. The lace may comprise a daisy chain configuration. The pin housing may be located in a key loop of the daisy chain configuration.

In various embodiments, the actuator may comprise a pneumatic actuator. A charged tank may be fluidly coupled to the pneumatic actuator. The lanyard body may further comprise a serrated portion including a plurality of teeth. The pin housing may comprise a pawl configured to engage the plurality of teeth. The actuator connect portion of the lanyard body may comprise a disrupted thread.

A method of making an evacuation system is provided, in accordance with various embodiments. A method of making an evacuation system may comprise disposing a soft cover over an inflatable slide, configuring a lace to close the soft cover, coupling a lanyard assembly to an actuator. The lanyard assembly may comprise a lanyard body and a pin housing slidably coupled to the lanyard body. The lanyard body may include an actuator connect portion coupled to a piston of the actuator. The method may further comprise locating the pin housing of the lanyard assembly in a key loop of the lace.

In various embodiments, the method may further comprise adjusting a length of the lanyard assembly by sliding the pin housing along a portion of the lanyard body.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Throughout the present disclosure, like reference numbers denote like elements. Accordingly, elements with like element numbering may be shown in the figures, but may not be necessarily be repeated herein for the sake of clarity. Cross hatching lines and/or surface shading lines may be used throughout the figures to denote different parts but not necessarily to denote the same or different materials.

As used herein, "aft" refers to the direction associated with the tail (i.e., the back end) of an aircraft, or generally, to the direction of exhaust of the gas turbine. As used herein, "forward" refers to the direction associated with the nose (i.e., the front end) of an aircraft, or generally, to the direction of flight or motion. As used herein, "distal" refers to the direction outward, or generally, away from a reference component. As used herein, "proximal" and/or "proximate" refers to a direction inward, or generally, towards the reference component.

Evacuation systems of the present disclosure may comprise a lanyard assembly. In various embodiments, the lanyard assembly may include a pin housing slidably (i.e., adjustably) coupled to a lanyard body. The pin housing may be configured to retain lacing used to close a soft cover located over an inflatable slide. The lanyard assembly may be coupled to an actuator. Upon a motivation of the actuator, the pin housing may be removed from the lacing and the soft cover may open and the inflatable slide may deploy. In various embodiments, a length of the lanyard assembly may be adjusted, thereby minimizing a distance the actuator piston will need to travel to remove the pin housing from the lacing.

Figure 1:
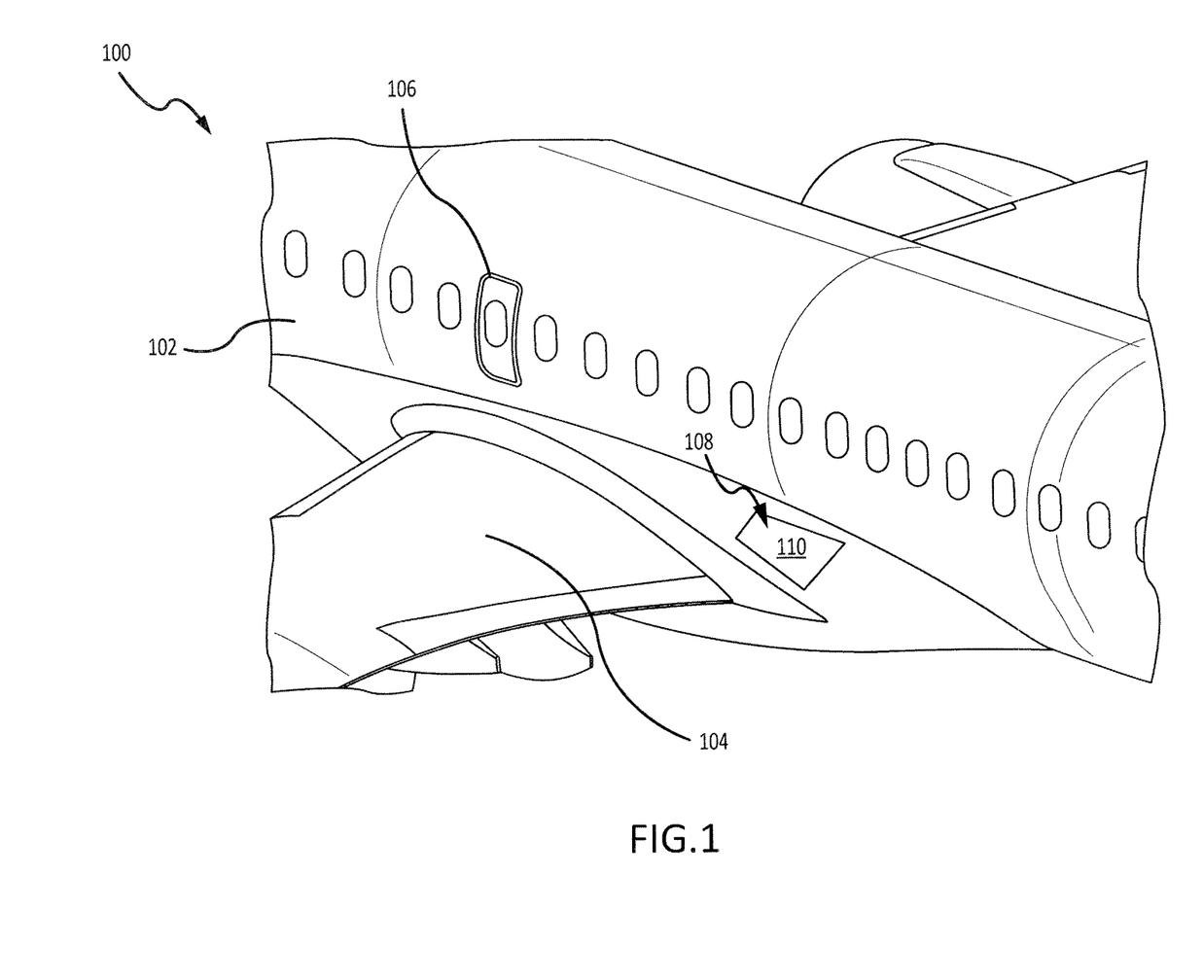
FIG. 1 illustrates an exemplary aircraft with an emergency evacuation system, in accordance with various embodiments.

Referring to FIG. 1, an exemplary aircraft 100 is shown, in accordance with various embodiments. Aircraft 100 may comprise a fuselage 102 with wings 104 fixed to fuselage 102. Emergency exit door 106 may be disposed on fuselage 102 over wing 104 such that passengers exiting emergency exit door 106 would exit onto wing 104. An emergency evacuation system 108 may be disposed aft of emergency exit door 106. A panel 110 may cover evacuation system 108 when installed on aircraft 100. In response to emergency exit door 106 opening, or in response to another evacuation event, evacuation system 108 may jettison panel 110 and deploy an inflatable slide. In various embodiments, evacuation system 108 may include and/or be housed within a packboard, which may be mounted to aircraft 100.

Figure 2A:
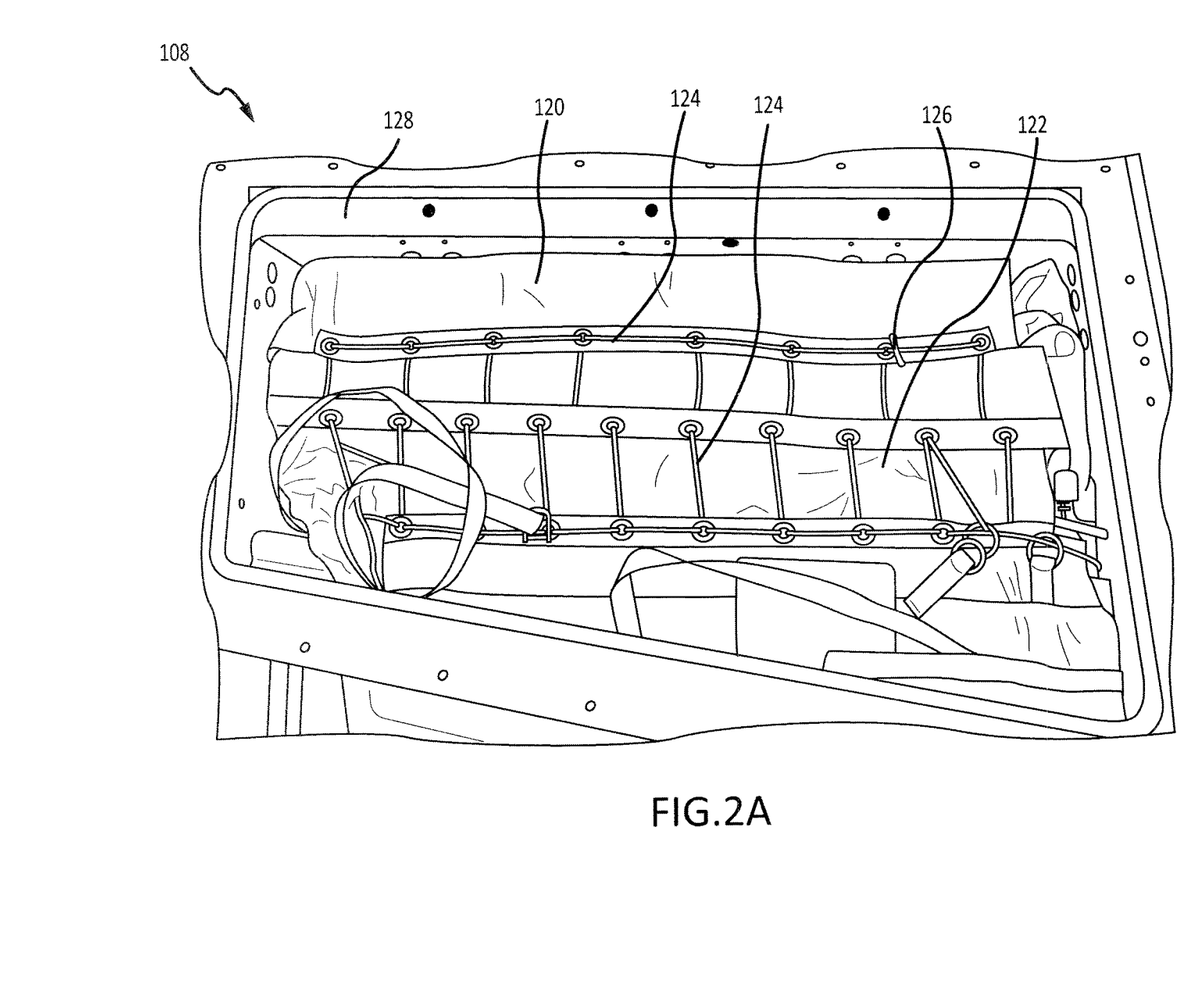
FIG. 2A illustrates a evacuation system including a slide in a soft cover with a laced enclosure and release pin, in accordance with various embodiments.

With reference to FIG. 2A, evacuation system 108 is shown as viewed from an outboard side, with panel 110 (of FIG. 1) removed from panel interface 128, in accordance with various embodiments. Evacuation system 108 may comprise a soft cover 120 containing a slide 122. A lace 124 may enclose soft cover 120 and retain slide 122 within soft cover 120. Lace 124 may be in a daisy chain or speed lacing configuration. For example, lace 124 may be configured in a series of loops with each loop extending through an opening in soft cover 120 and through an adjacent loop in the series. For example, a first loop may extend through a first opening and a second loop may extend through a second opening and through the first loop. A third loop may extend through a third opening and through the second loop. After a plurality of loops have been threaded together in this manner, a pin 126 may close the daisy chain or speed lacing.

Pin 126 may be slidably coupled to lace 124 such that lace 124 may unlace in response to a removal, or an uncoupling, of pin 126 from lace 124. Pin 126 may be disposed in a retaining structure, for example, in a final or "key" loop of the daisy chain configuration. In that regard, pin 126 being located in the key loop may prevent lace 124 from unfurling, and pulling pin 126 out the key loop may release lace 124. In other words, pulling pin 126 out the key loop may allow the key loop to loosen from the adjacent loop in the series, which may then loosen from the next adjacent loop, and so on until each of loops is loosened and soft cover 120 is free to open. An actuator, as described in further detail below, may be positioned to translate (i.e., pull) pin 126 and release slide 122.

Figure 2B:
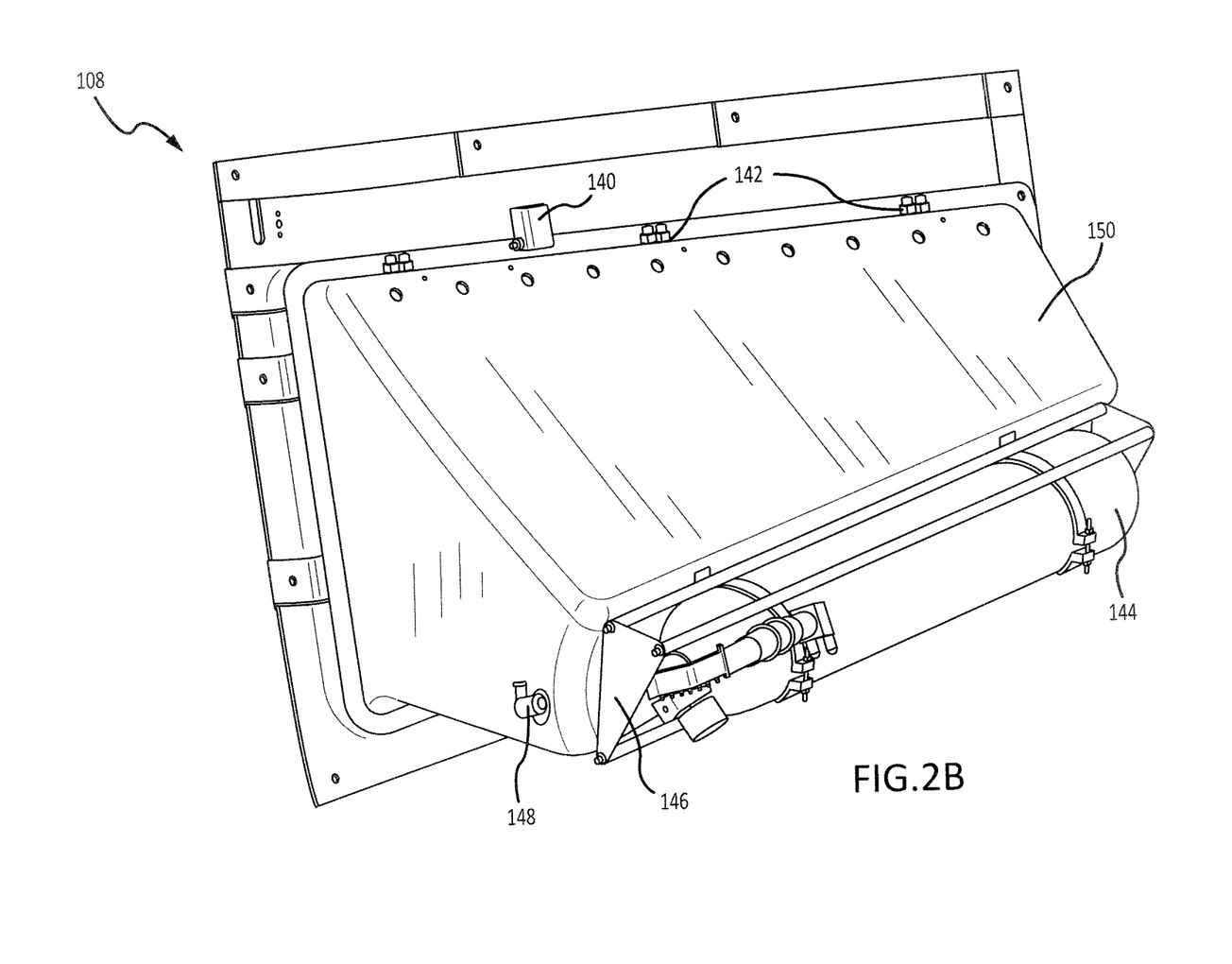
FIG. 2B illustrates an evacuation system with a charged tank and actuator coupled to a housing, in accordance with various embodiments.

With reference to FIG. 2B, evacuation system 108 is shown as viewed from an inboard direction, in accordance with various embodiments. Evacuation system 108 may include a housing 150 (also referred to as a packboard). An actuator 140 may be coupled to housing 150. Ball locks 142 may be coupled to housing 150 and configured to release panel 110 (of FIG. 1). A charged tank 144 may be mounted to the back (i.e., inboard surface) of housing 150. Charged tank 144 may provide pressurized gas to inflate slide 122 (of FIG. 2A), to motivate actuator 140, and to release ball locks 142. Charged tank 144 may be pneumatically coupled to components of evacuation system 108 through a valve 148.

Figure 3:
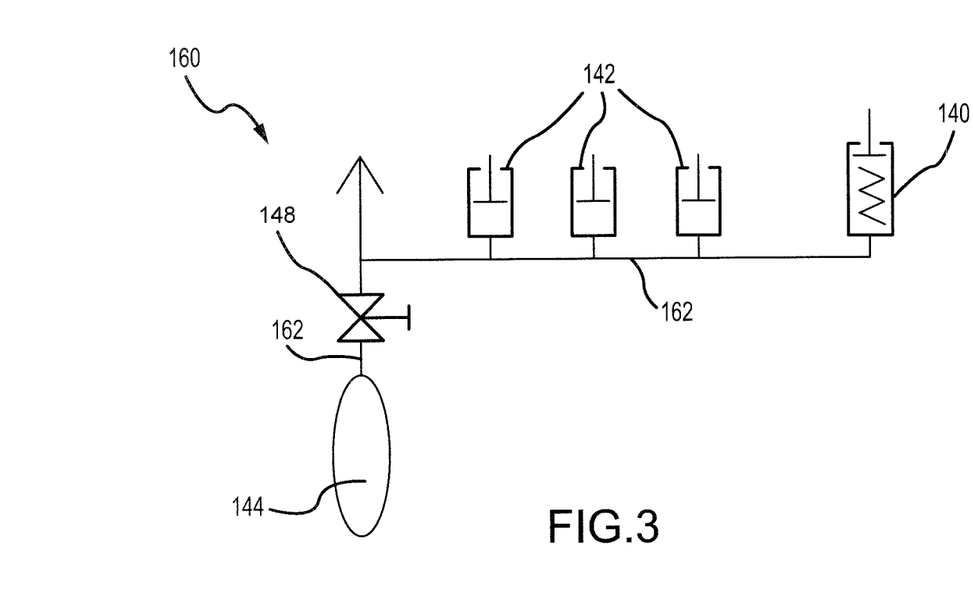
FIG. 3 illustrates a schematic diagram of a pneumatic system for an evacuation system, in accordance with various embodiments.

With reference to FIG. 3, a schematic diagram of a release system 160 pneumatically powered by charged tank 144 is shown, in accordance with various embodiments. Charged tank 144 may be coupled to components of release system 160 (e.g., actuator 140 and ball locks 142) by conduits 162. Conduits 162 may be gas lines to translate pressurized gas to pneumatic components of release system 160. Conduits 162 may include and/or be fluidly coupled to valve 148. Valve 148 may control the flow of fluid from charged tank 144 to evacuation slide 122 (of FIG. 2A), ball locks 142, and actuator 140. In various embodiments, valve 148 may be mechanically actuated in response to emergency exit door 106 opening and/or in response to an evacuation event. Ball locks 142 may be pneumatic ball locks fluidly coupled to charged tank 144 by conduit 162. Actuator 140 may be fluidly coupled to charged tank 144 by conduit 162. In various embodiment, actuator 140 may be motivated using pneumatic pressure from charged tank 144. In various embodiments, actuator 140 may be motivated by an electricity source or other power source.

Figure 4A:
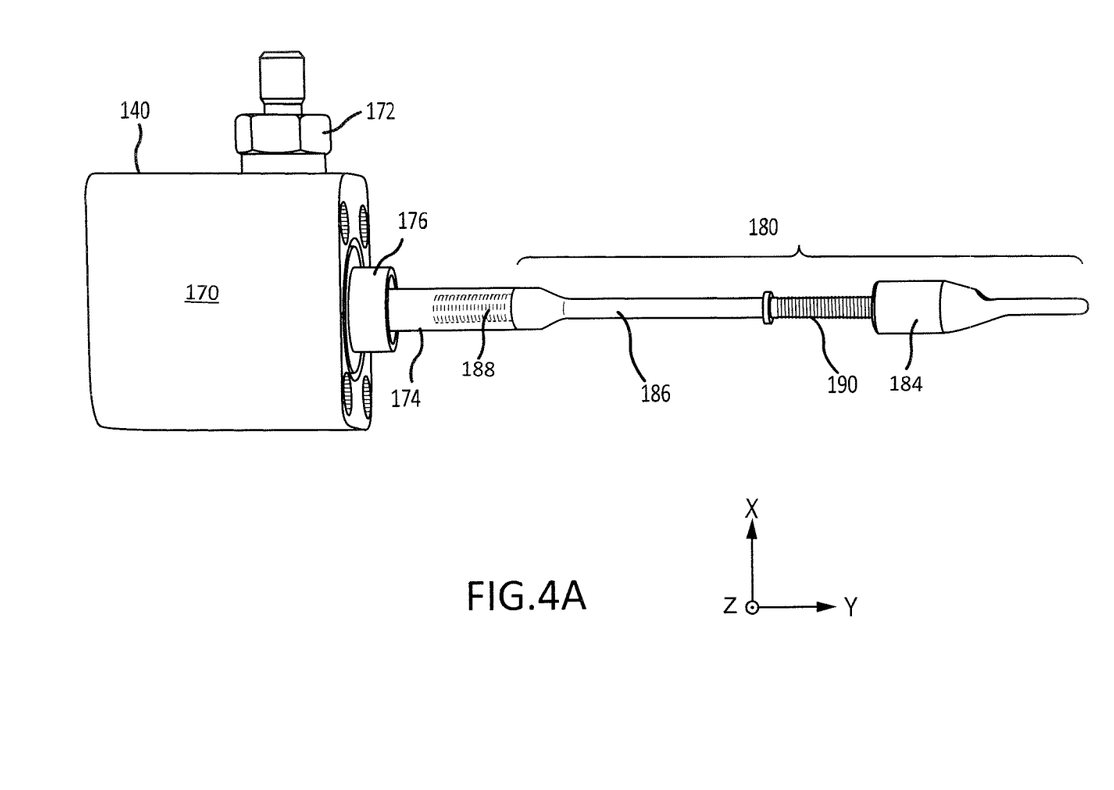
FIGS. 4A and 4B illustrate a lanyard assembly coupled to an actuator, in accordance with various embodiments.
Figure 4B:
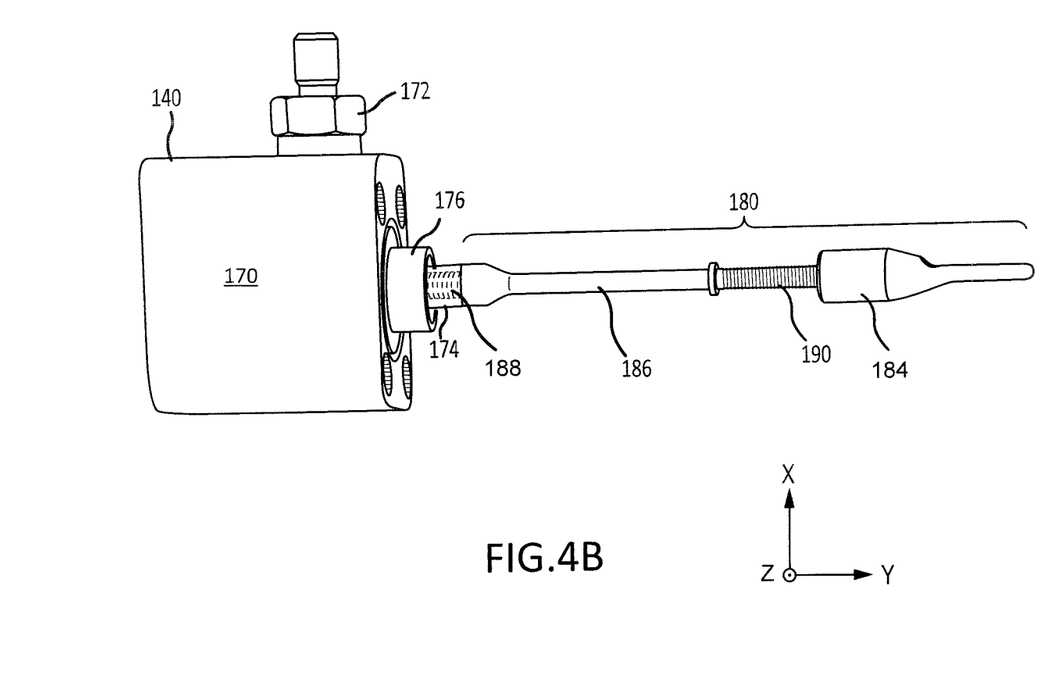

With reference to FIGS. 4A and 4B, actuator 140 is shown with piston 174 in an extended position and a retracted position, respectively. In various embodiments, actuator 140 may be a pneumatic actuator. In various embodiments, actuator 140 may be an electromechanical actuator, an electromagnetic actuator, or other actuator capable of extending and retracting piston 174. Actuator 140 may have a housing 170. Housing 170 may be a rectangular, circular, or other shaped housing suitable to provide mechanical support. Housing 170 may have an inlet 172, which may be fluidly coupled to charged tank 144 by conduit 162 of FIG. 3. A sleeve 176 may be an outlet for piston 174 such that piston 174 extends out of housing 170 through sleeve 176. In various embodiments, piston 174 of actuator 140 may retract into housing 170 in response to a pneumatic pressure applied at inlet 172 exceeding a predetermined pneumatic pressure threshold. Stated differently, piston 174 of actuator 140 may be in an extended position when a pneumatic pressure applied at inlet 172 is not above the predetermined pneumatic pressure threshold. A lanyard assembly 180 may be coupled to piston 174. Lanyard assembly 180 may be configured to retain lace 124, with momentary reference to FIG. 2A, and release lace 124 upon piston 174 retracting into housing 170.

Figure 5A:
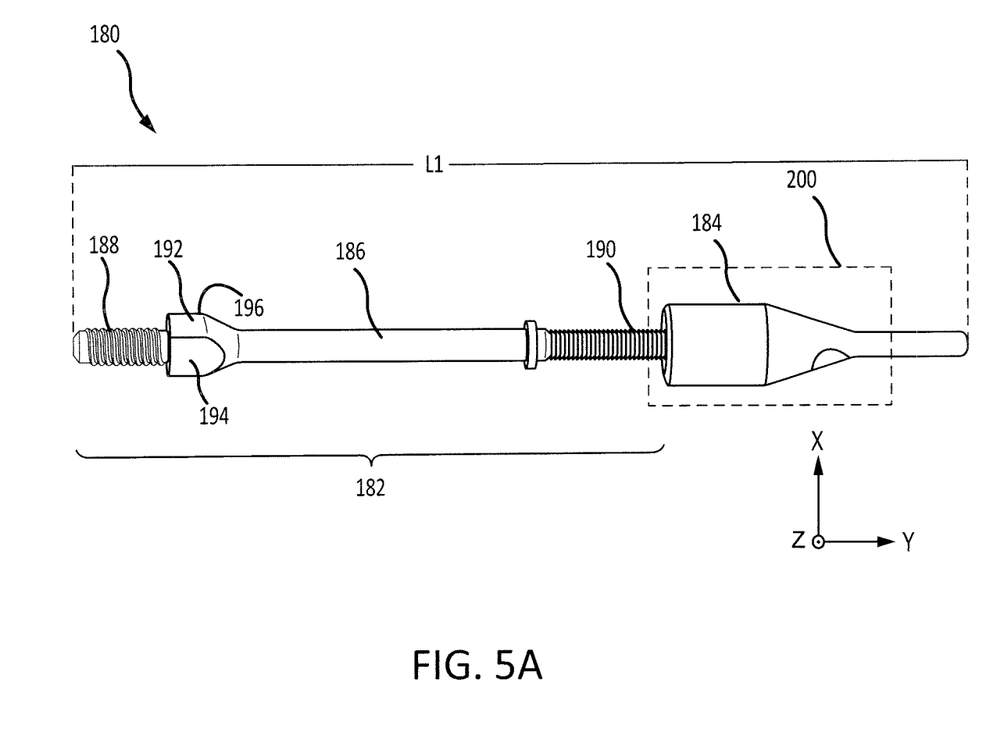
FIGS. 5A and 5B illustrate a lanyard assembly for an evacuation system, in accordance with various embodiments.

Referring to FIG. 5A, lanyard assembly 180 is illustrated, according to various embodiments. Lanyard assembly 180 may include a lanyard body 182 and a pin housing 184 adjustably coupled to lanyard body 182. Lanyard body 182 may include a center member 186, an actuator connect portion 188, and a pin housing connect portion 190. Center member 186 may be located between actuator connect portion 188 and pin housing connect portion 190. Stated another way, center member 186 may extend from actuator connect portion 188 to pin housing connect portion 190.

With reference to FIG. 4A and FIG. 5A, actuator connect portion 188 may be configured to mechanically couple lanyard assembly 180 to piston 174 of actuator 140. In various embodiments, actuator connect portion 188 may be threaded. Piston 174 may be configured to receive actuator connect portion 188 such that lanyard assembly 180 may be coupled to actuator 140 by engaging actuator connect portion 188 into piston 174. In various embodiments, actuator connect portion 188 may comprise a disrupted thread, which may allow actuator connect portion 188 to be "locked" into piston 174. Stated differently, once actuator connect portion 188 has been screwed into piston 174, the disrupted thread may prevent lanyard assembly 180 from uncoupling, or otherwise disengaging, from piston 174. In various embodiments, actuator connect portion 188 may be configured to couple to piston 174 via a locking pin connection, a snap fit connection, or other suitable mechanical coupling mechanism.

Returning to FIG. 5A, center member 186, actuator connect portion 188, and pin housing connect portion 190 of lanyard body 182 may be generally round or cylindrically-shaped. In other words, center member 186, actuator connect portion 188, and pin housing connect portion 190 may each comprise a circular-shaped cross-section in the XZ plane of the XYZ axis provided for reference. In various embodiments, an end 192 of center member 186 that is proximate to actuator connect portion 188 may comprise opposing flat (i.e., planar) surfaces 194 and 196. Surface 194 and surface 196 may be parallel to one another. End 192, comprising opposing flat surfaces 194 and 196, may provide an area which tends to be easily gripped by a wrench, hand, or other tool that may be employed when coupling lanyard assembly 180 to piston 174 (FIG. 4A).

In various embodiments, lanyard body 182, including center member 186, actuator connect portion 188, and pin housing connect portion 190, may comprise a plastic material. For example, center member 186, actuator connect portion 188, and pin housing connect portion 190 of lanyard body 182 may comprise polypropylene, polyvinyl chloride, polycarbonate, polyetheretherketone, polyoxymethylene, polytetrafluoroethylene, etc. In various embodiments, lanyard body 182 may comprise a nylon, metal, ceramic, or fibrous material. Lanyard body 182 may be formed by injection molding, additive manufacturing, stamping, casting, machining, or any other suitable manufacturing process. In various embodiments, lanyard body 182 may be configured to vary in rigidity. For example, actuator connect portion 188 may exhibit an increased rigidity as compared to center member 186 and pin housing connect portion 190, and pin housing connect portion 190 may exhibit a decreased rigidity as compared to center member 186 and actuator connect portion 188. In various embodiments, pin housing connect portion 190 and center member 186 may be configured to exhibit a flexibility and/or ability to bend without fracture, while actuator connect portion 188 may be configured to resist bending.

Pin housing 184 may comprise a plastic material. For example, pin housing 184 may comprise polypropylene, polyvinyl chloride, polycarbonate, polyetheretherketone, polyoxymethylene, polytetrafluoroethylene, etc. In various embodiments pin housing 184 may comprise a nylon, metal, ceramic, or fibrous material. Pin housing 184 may be formed by injection molding, additive manufacturing, stamping, casting, machining, or any other suitable manufacturing process.

Lanyard assembly 180 comprises a length L1 extending from an end of actuator connect portion 188 to an end of pin housing 184. Length L1 of lanyard assembly 180 may be adjusted by moving pin housing 184 along pin housing connect portion 190 toward center member 186. Stated differently, lanyard assembly 180 may be made shorter (i.e., length L1 may be decreased) by sliding pin housing 184 along pin housing connect portion 190 in the negative Y direction of the XYZ axes provided for reference.

Figure 5B:
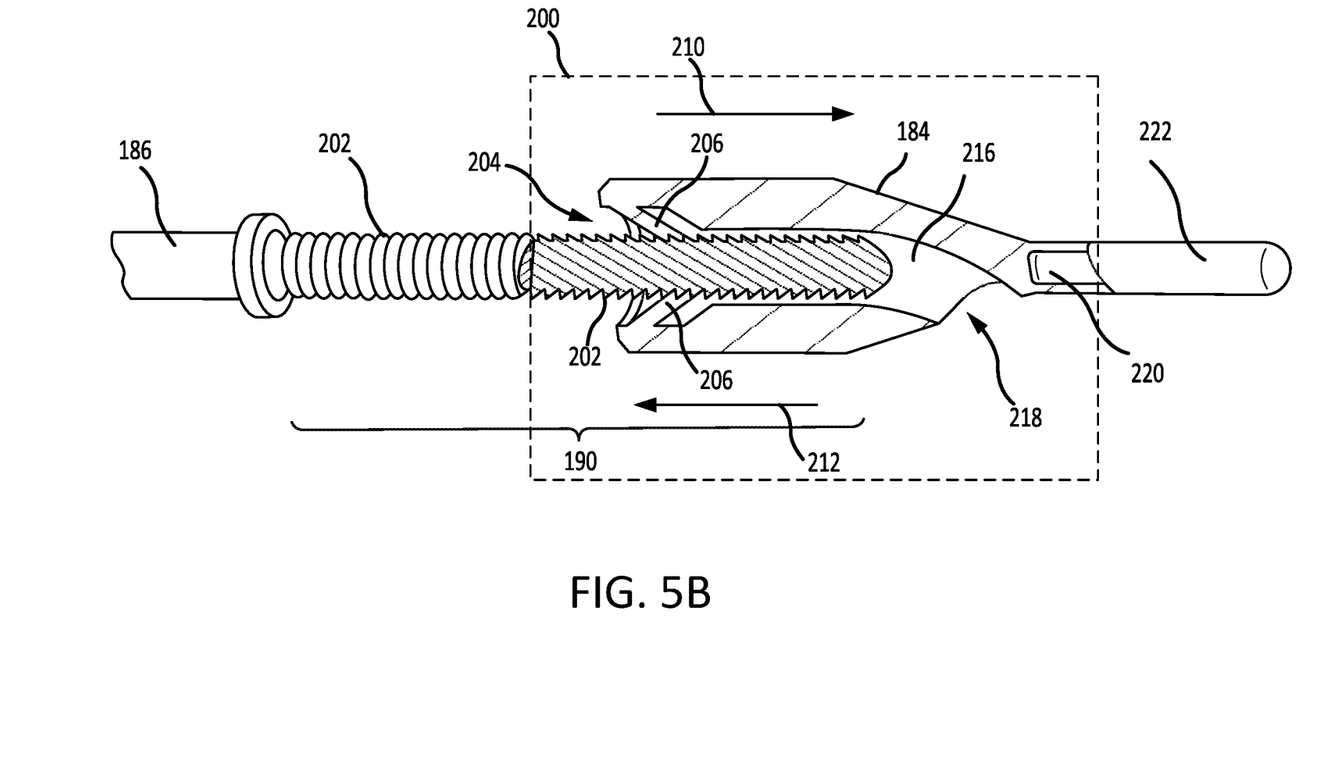

With reference to FIG. 5B, pin housing connect portion 190 and pin housing 184 are shown, with the portion of pin housing connect portion 190 and pin housing 184 located in box 200 shown in cross-section, in accordance with various embodiments. In various embodiments, pin housing connect portion 190 may be serrated. Pin housing connect portion 190 may comprise a plurality of teeth 202. Pin housing 184 may include an opening 204 and one or more pawls 206. Teeth 202 may engage with pawls 206 of pin housing 184. Opening 204 may be configured to receive pin housing connect portion 190. Pawls 206 may be configured to engage teeth 202. In that regard, pawls 206 may be configured to prevent teeth 202 that have passed through opening 204 in a first direction, (i.e., have traveled through opening 204 in the direction of arrow 210) from backing out of opening 204 in a second direction opposite the first direction (i.e., from traveling through opening 204 in the direction of arrow 212). Teeth 202 and pawls 206 may be configured such that pin housing connect portion 190 may only pass through opening 204 in one direction (i.e., in the direction of arrow 210). In various embodiments, pin housing connect portion 190 may be threaded and pin housing 184 may be configured to receive pin housing connect portion 190.

Pin housing 184 may comprise a chamber 216 extending from opening 204 to an opening 218. Pin housing connect portion 190 may be located in chamber 216. A portion of Pin housing connect portion 190 may extend out opening 218, depending on a desired length of lanyard assembly 180. For example, as pin housing connect portion 190 moves in the direction of arrow 210 and pin housing moves in the direction of arrow 212, pin housing connect portion 190 may travel out opening 218. In various embodiments, the shape or configuration of chamber 216 may cause pin housing connect portion 190 to bend. In this regard, pin housing connect portion may be flexible and/or capable of bending without fracture.

A pin 220 may be located in a pin end 222 of pin housing 184. Pin 220 may comprise a metal such as steel or aluminum. Pin 220 may strengthen and increase a rigidity of pin end 222.

Figure 6:
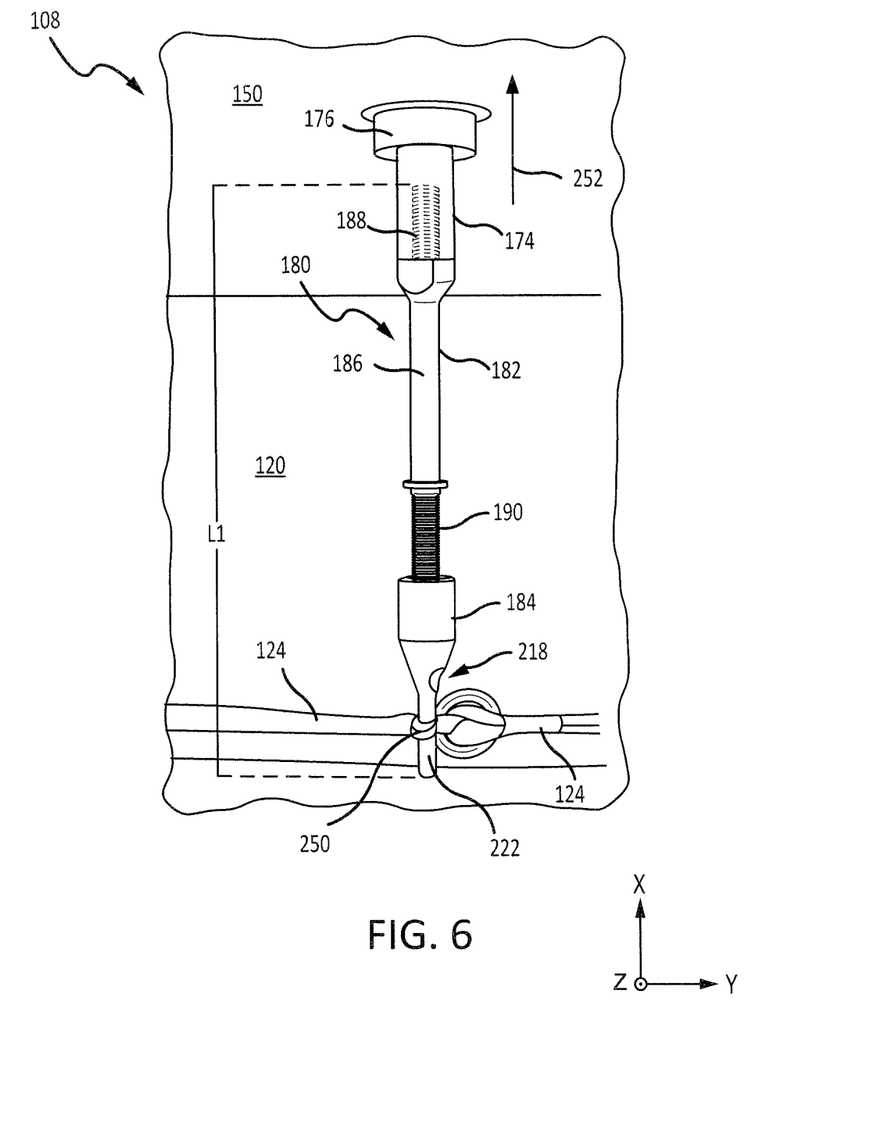
FIG. 6 illustrates an evacuation system having a lanyard assembly, in accordance with various embodiments.

Referring to FIG. 6, lanyard assembly 180 retaining lace 124 of evacuation system is illustrated, in accordance with various embodiments. Pin end 222 of pin housing 184 may be located in a key loop 250 of lace 124. Pin end 222 being located in key loop 250 may prevent lace 124 from unfurling and soft cover 120 from opening. Sleeve 176 and piston 174 of actuator 140 may be located through an opening in housing 150. Piston 174 may be configured to pull (i.e. translate) lanyard assembly 180 in the direction of arrow 252 and remove pin end 222 from key loop 250. Length L1 of lanyard assembly 180 may be adjusted to minimize a distance piston 174 will need to travel to remove pin end 222 from key loop 250. In that regard, pin housing 184 may be translated along pin housing connect portion 190 until lanyard assembly 180 is taut. Stated another way, to minimize a distance piston 174 must translate to remove pin end 222 from key loop 250, pin housing 184 may be located as close to center member 186 as possible without removing pin end 222 from key loop 250. Stated yet another way, a location of key loop 250 may vary from evacuation system to evacuation system due to the flexible nature of soft cover 120. The adjustability in length L1 of lanyard assembly 180 tends to allow lanyard assembly 180 to made taut and a travel distance of piston 174 to be minimized at a variety of key loop 250 locations. Lanyard assembly 180 being adjustable in length tends to reduce piston travel distance. Reduction in piston travel distance tends to allow for an actuator of reduced size and/or reduced mass.

Figure 7A:
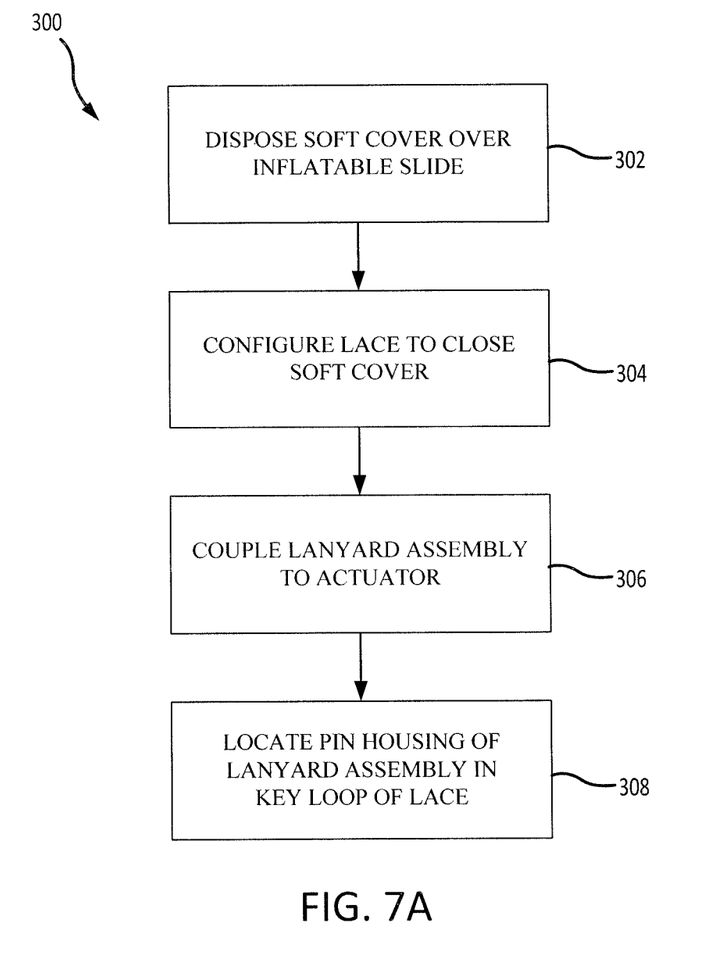
FIGS. 7A and 7B illustrate a method of making an evacuation system, in accordance with various embodiments.

FIG. 7A illustrates a method 300 of making an evacuation system. Method 300 may include disposing a soft cover over an inflatable slide (step 302), configuring a lace to close the soft cover (step 304), coupling a lanyard assembly to an actuator, (step 306), and locating a pin housing of the lanyard assembly in a key loop of the lace (step 308). In various embodiments, the lanyard assembly may comprise a lanyard body and a pin housing slidably coupled to the lanyard body.

In various embodiments, with combined reference to FIG. 2A, FIG. 6, and FIG. 7A, step 302 may comprise disposing soft cover 120 over inflatable slide 122. Step 304 may comprise configuring lace 124 to close soft cover 120. Step 306 may comprise coupling lanyard assembly 180 to actuator 140. Step 308 may comprise locating pin housing 184 of lanyard assembly 180 in key loop 250 of lace 124. Lanyard assembly 180 may comprise lanyard body 182 (FIG. 5A), which may be configured to couple to piston 174 of actuator 140, and pin housing 184 slidably coupled to lanyard body 182.

Figure 7B:
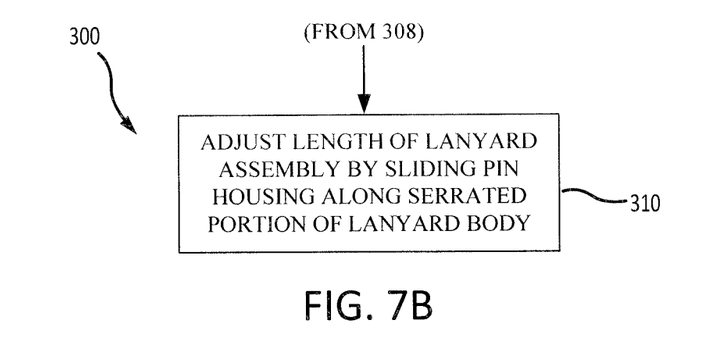

Referring to FIG. 7B, in various embodiments, method 300 may further comprise adjusting a length of the lanyard assembly by sliding the pin housing along a serrated portion of the lanyard body (step 310). In various embodiments, with combined reference to FIG. 6 and FIG. 7B, step 310 may comprise adjusting length L1 of lanyard assembly 180 by sliding pin housing 184 along pin housing connect portion 190 of lanyard body 182.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A lanyard assembly for an evacuation system, comprising:
   a lanyard body comprising an actuator connect portion, a pin housing connect portion, and a center member extending between the actuator connect portion and the pin housing connect portion; and
   a pin housing slidably coupled to the pin housing connect portion of the lanyard body, the pin housing defining a first opening configured to receive the pin housing connect portion of the lanyard body, the pin housing including a pin end located opposite the first opening,
   wherein the pin housing defines a chamber extending from the first opening of the pin housing to a second opening defined by the pin housing,
   wherein the second opening is located between the pin end of the pin housing and the first opening of the pin housing, and
   wherein the pin housing is configured such that as the pin housing slides towards the center member, the pin housing connect portion slides out the second opening to decrease a length of the lanyard assembly.

2. The lanyard assembly of claim 1, wherein the pin housing connect portion comprises a plurality of teeth.

3. The lanyard assembly of claim 2, wherein the pin housing comprises a pawl configured to engage the plurality of teeth.

4. The lanyard assembly of claim 1, further comprising a pin located in the pin end of the pin housing.

5. The lanyard assembly of claim 4, wherein the pin comprises a metal.

6. The lanyard assembly of claim 5, wherein the pin housing comprises a plastic.

7. The lanyard assembly of claim 1, wherein the actuator connect portion is threaded.

8. The lanyard assembly of claim 1, wherein the actuator connect portion comprises a disrupted thread.

9. The lanyard assembly of claim 1, wherein an end of the center member proximate the actuator connect portion comprises a first flat surface and a second flat surface opposite the first flat surface.

10. An evacuation system, comprising:
    an inflatable slide;
    a soft cover containing the inflatable slide;
    a lace holding the soft cover closed;
    an actuator; and
    a lanyard assembly coupled to the actuator, the lanyard assembly comprising:
        a lanyard body comprising an actuator connect portion, wherein in the actuator connect portion is coupled to a piston of the actuator, and
        a pin housing slidably coupled to the lanyard body and configured to retain the lace.

11. The evacuation system of claim 10, wherein the actuator is configured to release the lace by translating the lanyard assembly.

12. The evacuation system of claim 10, wherein the lace comprises a daisy chain configuration.

13. The evacuation system of claim 12, wherein the pin housing is located in a key loop of the daisy chain configuration.

14. The evacuation system of claim 10, wherein the actuator comprises a pneumatic actuator.

15. The evacuation system of claim 14, further comprising a charged tank fluidly coupled to the pneumatic actuator.

16. The evacuation system of claim 10, wherein the lanyard body comprises a serrated portion including a plurality of teeth.

17. The evacuation system of claim 16, wherein the pin housing comprises a pawl configured to engage the plurality of teeth.

18. The evacuation system of claim 10, wherein the actuator connect portion of the lanyard body comprises a disrupted thread.

19. A method of making an evacuation assembly, comprising:
    disposing a soft cover over an inflatable slide;
    configuring a lace to close the soft cover;
    coupling a lanyard assembly to an actuator, the lanyard assembly comprising:
        a lanyard body including an actuator connect portion configured to engage a piston of the actuator, and
        a pin housing slidably coupled to the lanyard body; and
    locating the pin housing of the lanyard assembly in a key loop of the lace.

20. The method of claim 19, further including adjusting a length of the lanyard assembly by sliding the pin housing along a portion of the lanyard body.

* * * * *